US005167055A

United States Patent [19]

Stoddart et al.

[11] Patent Number: 5,167,055

[45] Date of Patent: Dec. 1, 1992

[54] END CAP FOR PAINT ROLLER FRAME

[75] Inventors: Kenneth R. Stoddart, Fond Du lac, Wis.; Thomas Teesdale, Blue Bell, Pa.

[73] Assignee: Bestt Rollr, Inc., Fond Du Lac, Wis.

[21] Appl. No.: 797,185

[22] Filed: Nov. 25, 1991

[51] Int. Cl.[5] .......................... B05C 1/08; B23B 13/02

[52] U.S. Cl. .................................. 29/110.5; 29/116.1; 29/123; 15/230.11

[58] Field of Search .................... 29/110.5, 116.1, 123, 29/126; 15/230, 230.11

[56] References Cited

U.S. PATENT DOCUMENTS

| | | | |
|---|---|---|---|
| 2,741,013 | 4/1956 | Messmer | 29/116.1 |
| 2,749,599 | 6/1956 | Kreger | 29/123 X |
| 2,758,364 | 8/1956 | McMillan | 29/116.1 |
| 2,970,366 | 2/1961 | Gill | 29/116.1 |
| 2,982,010 | 5/1961 | Johns | 29/116 |
| 3,102,327 | 9/1963 | Wiegand | 29/116.1 |
| 3,165,772 | 1/1965 | McGinley | 15/230.11 |
| 3,332,131 | 7/1967 | Weiler | 29/116.1 X |
| 3,354,493 | 11/1967 | Pharris | 15/230.11 |
| 3,745,624 | 7/1973 | Newman | 29/116.1 |
| 3,986,226 | 10/1976 | Roe et al. | 15/230 |
| 4,077,082 | 3/1978 | Roe et al. | 15/230 |
| 4,332,067 | 6/1982 | Pearce | 29/116 |
| 4,897,893 | 2/1990 | Barker | 15/230 |
| 4,937,909 | 7/1990 | Georgiou | 15/230 |

FOREIGN PATENT DOCUMENTS

| | | | |
|---|---|---|---|
| 9103331 | 3/1991 | PCT Int'l Appl. | 15/230.11 |

*Primary Examiner*—Timothy V. Eley
*Assistant Examiner*—C. Richard Martin
*Attorney, Agent, or Firm*—Foley & Lardner

[57] ABSTRACT

A paint roller frame includes a handle, a shaft extending from the handle and bent perpendicular to the handle, and a roller cage assembly mounted on the shaft. The roller cage assembly includes cross wires attached to wire rings at either end and end caps fitted onto the wire rings. Each end cap includes an annular space between a hub and skirt for receiving the wire rings. The width of the annular space is such that when a cross wire breaks off from a wire ring, the cross wire is maintained in position in the annular space between the hub and skirt.

5 Claims, 2 Drawing Sheets

END CAP FOR PAINT ROLLER FRAME

BACKGROUND OF THE INVENTION

This invention relates generally to an end cap for a paint roller frame, and in particular, to an improved end cap for a paint roller frame that extends the useful life of the paint roller frame.

Paint roller frames typically include a handle having a hand grip, a shaft extending at a right angle to the handle, and a roller cage assembly mounted on the shaft. The roller cage assembly includes inboard and outboard end caps and supports a roller cover by frictional retention.

U.S. Pat. No. 4,332,067 discloses a paint roller frame of the general type discussed above. The '067 patent shows a plurality of cross wires brazed at their ends to wire rings. Roller end caps are then forced over the wire rings.

The cross wires collectively define an outer diameter that is slightly greater than the inside diameter of the roller cover. When the cover is forced over the cross wires, they are resiliently flexed inwardly, thereby creating an outward biasing force on the cover. This force tends to frictionally maintain the cover firmly in place. The described design suffers from the potential problem of one or more of the cross wires breaking from the wire rings at the brazed connection. When this happens, the cross wires become loose and fail to provide support and fixed positioning for the roller cover. As a result, the roller cover, when pressed against a surface, can deform inwardly in that area and fail to effectively coat the surface. Also, the roller cover is more susceptible to movement axially on the roller cage and a possible failure to rotate in unison with the roller cage. These problems can so impair the functioning of the paint roller frame as to render it useless.

U.S. Pat. No. 4,897,893 also discloses a paint roller frame of the general type discussed above. Rather than attaching the cross wires of the '893 patent to a wire ring, they are individually secured in an annular slot or groove in the end cap. This construction obviously eliminates the problem of the cross wires breaking from the wire ring. However, by eliminating the wire ring, the advantages of the wire ring structure are also eliminated and new problems created. For example, there is missing the support for the roller cover that is provided by a rigid wire ring in each end cap. The only support for the roller cover at its ends are the end caps themselves, which are made of plastic and do not provide the durability or strength of a metal support. Furthermore, the connection between the ends of the cross wires and the end cap is ineffective. Because the ends of the wires are simply stuck in an annular groove, the wires are subject to circumferential movement around the groove and axial movement in and out of the groove. The lack of a unitary bond between all the cross wires at their ends causes a nonuniform resilience of the roller cage as a whole, which can result in an uneven and irregular coating of surfaces. Moreover, there is little to prevent an end cap from axially separating from the ends of the cross wires.

In addition, the outboard end cap of the '893 patent is a two piece structure in which each piece must be molded to close tolerances in order to function effectively. This increases the cost of manufacture.

SUMMARY OF THE INVENTION

With the above discussed problems in mind, it is an object of the present invention to provide a paint roller frame that gives maximum support to the roller cover at its ends as well as intermediate portions.

It is another object of the present invention to provide a paint roller frame having a roller cage assembly that is uniformly resilient.

It is a further object of the present invention to provide a paint roller frame with end caps that are easily fastened to the roller cage.

It is yet another object of the present invention to provide a paint roller frame with end caps that are simple in construction and easy to manufacture.

It is a still further object of the present invention to provide a paint roller frame which has an extended useful life.

These and other objects of the present invention are obtained by a paint roller frame which includes a shaft and a roller cage assembly mounted on the shaft. The roller cage assembly includes cross wires whose ends are attached to wire rings. Inboard and outboard end caps are fastened to the wire rings by forcing the caps onto the wire rings with a snap fit. Each end cap includes a hub and skirt that define an annular space, the annular space having a width substantially equal to combined diameters of the wire ring and the cross wire, whereby the cross wires are retained in position even if they break off the wire ring.

DETAILED DESCRIPTION OF THE PREFERRED EMBODIMENTS

Figure 1:
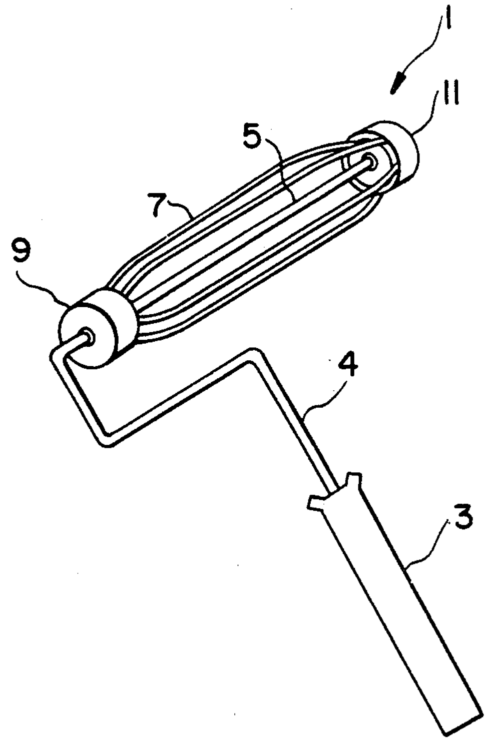
FIG. 1 is a perspective view of the paint roller frame of the invention.

FIG. 1 shows the paint roller frame of the present invention generally designated at 1. The frame includes a handle 3, a rod variously bent to include a handle portion 4 and a shaft 5, cross wires 7, inboard end cap 9 and outboard end cap The cross wires 7 are connected at each end to a wire ring 51 (see FIGS. 2-4).

The principle feature of the present invention relates to the novel construction of the inboard and outboard end caps, and their connection to the wire rings of the roller cage assembly. Both end caps are very similar in construction, except for the differences noted below, and thus only the outboard end cap will be described in detail.

Figure 2:
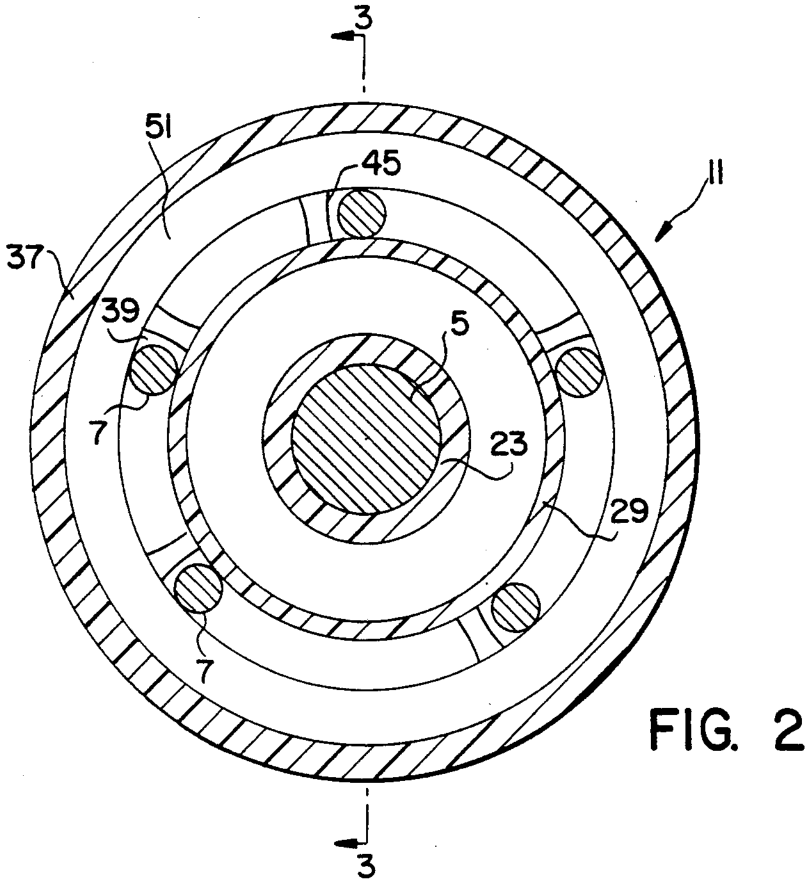
FIG. 2 is a sectional view of the outboard end cap taken on line 2—2 of FIG. 3, but excluding the roller cover.
Figure 3:
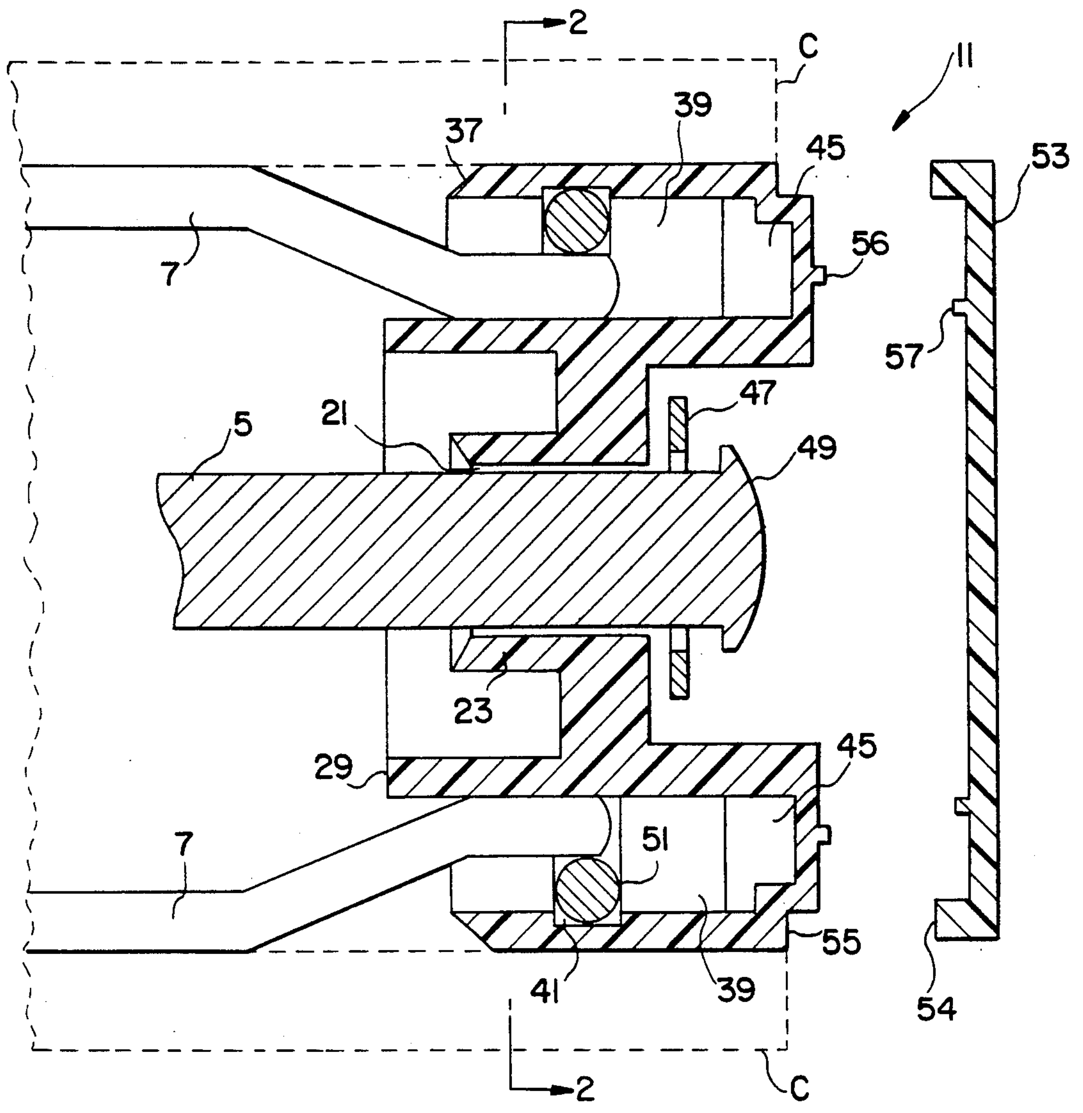
FIG. 3 is a sectional side view of the end cap taken on line 3—3 of FIG. 2, but showing the outboard end cap separated from the cover.
Figure 4:
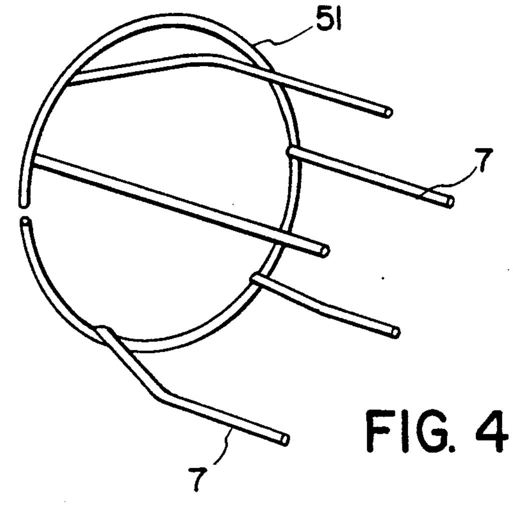
FIG. 4 is a fragmented perspective view of the connection between the cross wires and the wire ring.

Referring to FIGS. 2 and 3, the outboard end cap 11 has a central opening 21 in a central bearing portion 23 thereof for receiving the shaft 5. The end cap is maintained on the shaft 5 by an enlarged portion 49 on the end of the shaft which may be produced, for example, by peening over the end of the shaft. A washer 47 is positioned over the end of the shaft portion between the end cap and the enlarged end 49. The shaft may be fastened by other suitable means such as a wing nut, cotter pin, etc. The bearing 23 supports the journal portion of the shaft 5. The inner axial end of the bearing 23 is beveled inward to facilitate insertion of the shaft 5.

An annular hub 29 is formed between the bearing 23 and an outer skirt 37, with the hub extending axially inwardly beyond both the bearing 23 and the skirt for supporting the wires 7, as will be described in more detail hereinbelow. An annular space 39 between the skirt and hub is dimensioned to receive wire ring 51 and the adjacent cross wires as shown in FIG. 3. A groove 41 is formed in the skirt 37 for seating the wire ring 51. The annular space 39 and groove 41 are sized to provide a forcible snap fit of the end cap onto the wire ring assembly. Radially formed webs 45 (FIGS. 2 and 3) extending from the skirt 37 to the base of the hub 29 provide reinforcement at the axial outer end of the cap. A roller cover C is slidably mounted on the roller cage and frictionally maintained in position by the cross wires 7 and the end caps.

The connected wire rings 51 and cross wires inside the end caps 9,11 insure maximum support for the roller cover at its ends. In prior art roller cages using cross wires but not a wire ring, support for the roller cover was provided by the end caps themselves and the ends of the cross wires. However, the end caps are typically made of plastic and therefore do not provide a strong and durable support for the roller cover C at its ends. The insertion of the ends of the cross wires into the end caps adds very little support because there is still a large circumferential area which is unsupported by the ends of the cross wires. In the present invention, the wire rings 51 and cross wires provide complete and rigid circumferential support for the roller cover on the end caps, thereby eliminating deformation of the caps and possible failure.

As can be seen in FIG. 3, the combined thickness of the wire ring and the adjoined cross wire is slightly in excess of the width of space 39. When the end cap is forced over the cross wires and wire ring, the round surface of the wire ring functions as a cam surface to distort the outer open end of the skirt radially outward a sufficient amount to permit entry of the wire ring and connected cross wires into the annular space. Continued movement of these parts results in the wire ring 51 being snapped into the groove 41 as shown in FIG. 3. The dimensional relationship of the annular space 39, groove 41, wire ring 51, and cross wires 7 is such that the skirt cannot be distorted inward thereby providing a rigid support for the roller cover C. In addition, the cross wires 7 are prevented from moving radially inward if disconnected from the wire ring, due to the contiguous wall surface of the hub 29.

It is important that the roller cover, shown in dashed lines at C in FIG. 3, be maintained in its proper, FIG. 3 position on the roller cage assembly. If the roller cover C moves axially on the roller cage, it may be impossible to effectively rotate the roller cover in unison with the cage, even if the roller cover remains in proper axial position. In a situation where there is not a tight frictional fit between the roller cover and the cross wires 7, the roller cover may not rotate at all or only partially. As one tries to apply paint with the roller, the roller cover will not rotate and thus one is merely smearing the paint onto the surface.

The outside diameter of the cylindrical surface defined by the intermediate section of the cross wires 7 is slightly greater than the inside diameter of the roller cover C, in order to frictionally maintain the roller cover C in position. As the roller cover C is slidable mounted onto the roller cage, the cross wires 7 are resiliently deformed slightly inwardly therefore producing a biasing counter force on the roller cover to frictionally retain the roller cover in place.

In prior devices the inward force applied by the roller cover, in the event a cross wire becomes disconnected, would be accommodated by corresponding movement of the cross wire, whereby the tight frictional fitting of the roller cover in such area would be disrupted. In the present invention, such a disruption is precluded by virtue of the hub 29 which prevents the cross wire 7 from moving radially inward. Therefore, the frictional force between the roller cover and the cross wires remains intact even if a cross wire breaks away from the wire ring. This results in a significantly longer useful life for the paint roller frame.

The fact that each of the cross wires 7 is welded or brazed at the opposite ends thereof to a wire ring 51 provides a roller cage that is uniformly resilient therefore insuring maximum consistency in coating thickness. Because the cross wires are already fastened to the wire ring, the assembly of the roller cage assembly is very simple. The end caps are merely pushed and snap fitted onto the wire rings 51. The inboard end cap 9 requires no outer cover and is therefore a simple one-piece cap. The outboard end cap 11 is provided with a generally flat cover 53 formed with a peripheral flange 54 adapted to be received in a peripheral groove 55 formed in the adjacent end of the cap. Annular ridges 56 and 57 are formed on the outer face of the end cap and the inner surface of the cover 53, respectively. The cover 53 is attached to the end cap 11 by either selectively heating the circumferential ridges 56 and/or 57 or by applying adhesive to the ridges 56 and/or 57 and then placing the end cap cover 53 in position on the end cap 11. The end cap is thus easy to manufacture and assemble.

The internal structure of the inboard end cap is similar to that of the above-described outboard end cap, including the provision of the annular hub 29. The external structure of the inboard end cap differs only in that there is an outwardly directed peripheral flange provided at the base of the inboard end cap skirt that acts as a stopping means for the roller cover, which is inserted over the cage assembly toward the inboard end cap, or to the left as shown in FIG. 3. Also, since the shaft 5 extends through the inboard end cap, a separate cover is not needed. Rather, the outer surface of the inboard end cap is concavely shaped to receive the handle, in a well known manner. The handle is formed with peripheral detents or projections to limit movement of the shaft into the cage assembly.

Although the invention has been shown and described with respect to the preferred embodiment, it is obvious that equivalent alterations and modifications will occur to those skilled in the art. The present invention includes all such equivalent alterations and modifications, and is limited only by the scope of the claims.

What is claimed is:

1. A paint roller frame comprising:

a handle;

a shaft extending from the handle for receiving a roller cage assembly;

a roller cage assembly mounted on the shaft, said roller cage assembly including a plurality of cross wires having first and second ends, first and second wire rings attached to the first and second ends of the cross wires, respectively;

inboard and outboard end caps fitted onto said cross wires and wire rings;

each end cap including an annular bearing for receiving said shaft for rotation in said bearing, a hub radially outwardly spaced from said bearing and defining an annular space therebetween, and a peripheral skirt having an axially inner end and being spaced radially outwardly from said hub so as to define an annular space therebetween, the width of the annular space between said skirt and said hub being slightly less than the combined diameter of the wire ring and cross wire whereby one or both of said skirt and hub are slightly distended when each said end cap is positioned over the adjacent wire ring and connected cross wires;

means for retaining said end caps in an axially aligned position over said wire rings and cross wires; and wherein said hub includes an axially inner end which extends axially inwardly beyond said axially inner end of said skirt thereby to provide a substantial area of engagement between the hub and adjacent ends of said cross wires thereby to preclude radially inward movement of the cross wires in the event the cross wires become disconnected from the wire ring.

2. The paint roller frame of claim 1 wherein said peripheral skirt includes an internal surface, and wherein said means for retaining said end cap comprises a groove formed in said internal surface of the skirt, in which said wire ring is adapted to snap fit thereby axially aligning and retaining said end cap.

3. The paint roller frame of claim 1 wherein the end caps are made of a plastic material.

4. The paint roller frame of claim 3, wherein the outboard end cap further comprises a cover for the outboard end cap, and means for securing said cover to said outboard end cap.

5. The paint roller frame of claim 1 wherein the ends of said cross wires engage said hub along a distance approximately double the diameter of said wire ring so as to provide rigid support for a roller cover positioned over said cross wires and said end caps.

* * * * *